United States Patent
Gorian et al.

(10) Patent No.: US 7,657,092 B2
(45) Date of Patent: Feb. 2, 2010

(54) METHODS AND SYSTEMS FOR DETECTING CONCEALED OBJECTS

(75) Inventors: Izrail Gorian, Watertown, MA (US); Galina Doubinina, Watertown, MA (US)

(73) Assignee: Iscon Video Imaging, Inc., Watertown, MA (US)

( * ) Notice: Subject to any disclaimer, the term of this patent is extended or adjusted under 35 U.S.C. 154(b) by 743 days.

(21) Appl. No.: 11/312,898

(22) Filed: Dec. 20, 2005

(65) Prior Publication Data

US 2007/0122038 A1    May 31, 2007

Related U.S. Application Data

(60) Provisional application No. 60/740,743, filed on Nov. 30, 2005.

(51) Int. Cl.
*G06K 9/00* (2006.01)

(52) U.S. Cl. ............... 382/181; 250/332; 250/334; 250/341.6; 382/103; 702/131; 702/134

(58) Field of Classification Search ............ 250/332, 250/334, 336.1, 370.11, 346.1; 342/22, 27, 342/52, 90, 179, 197, 351; 382/103, 190, 382/181, 191; 702/131, 134
See application file for complete search history.

(56) References Cited

U.S. PATENT DOCUMENTS

| | | | |
|---|---|---|---|
| 5,007,432 A | 4/1991 | Keller et al. | |
| 5,070,242 A | 12/1991 | McClelland et al. | ......... 250/339 |
| 5,227,800 A | 7/1993 | Huguenin et al. | ........... 342/179 |
| 5,747,719 A | 5/1998 | Bottesch | ...................... 89/1.1 |
| 6,234,669 B1 | 5/2001 | Kienitz et al. | |
| 6,353,224 B1 | 3/2002 | Sinclair et al. | ........... 250/336.1 |
| 6,359,582 B1 * | 3/2002 | MacAleese et al. | ........... 342/22 |
| 6,442,419 B1 | 8/2002 | Chu et al. | |
| 6,940,071 B2 * | 9/2005 | Ramsden et al. | ........ 250/370.11 |
| 7,167,123 B2 * | 1/2007 | Hausner et al. | ................ 342/22 |
| 7,202,478 B2 * | 4/2007 | Ramsden et al. | ......... 250/361 R |
| 7,365,672 B2 * | 4/2008 | Keller et al. | ................... 342/22 |
| 2004/0000645 A1 * | 1/2004 | Ramsden et al. | ......... 250/361 R |
| 2005/0104603 A1 | 5/2005 | Peschmann et al. | ......... 324/637 |
| 2005/0230604 A1 | 10/2005 | Rowe et al. | .................. 250/221 |
| 2007/0075246 A1 * | 4/2007 | Gatt | ......................... 250/341.6 |
| 2008/0129581 A1 * | 6/2008 | Douglass et al. | .............. 342/52 |
| 2008/0195347 A1 * | 8/2008 | Gatt | ........................... 702/131 |

FOREIGN PATENT DOCUMENTS

| | | |
|---|---|---|
| WO | WO 87/00632 | 1/1987 |
| WO | 9100985 A1 | 1/1991 |
| WO | WO 03/095998 | 11/2003 |

(Continued)

OTHER PUBLICATIONS

International Search Report for PCT/US06/61273 filed Nov. 28, 2006, dated Mar. 4, 2008. Applicant: Iscon Video Imaging, Inc.

(Continued)

*Primary Examiner*—Gregory M Desire
(74) *Attorney, Agent, or Firm*—Burns & Levinson LLP; Orlando Lopez

(57) ABSTRACT

Methods and systems for detecting the presence of concealed objects.

50 Claims, 12 Drawing Sheets

FOREIGN PATENT DOCUMENTS

| | | |
|---|---|---|
| WO | WO 2005/019863 | 3/2005 |
| WO | WO 2006090353 A1 * | 8/2006 |

OTHER PUBLICATIONS

Mukesh, M.C. et al. Survey of Image Denoising Techniques. Proc. of GSPx 2004 (Sep. 27-30, 2004) 1-7.

Scheunders, P. Denoising of multispectral images using wavelet thresholding. Proc. SPIE Image and Signal Proc. for Remote Sensing IX (2003) 28-35.

Pratt, W. K. Digital Image Processing. John Wiley & Sons (1978). ISBN 0-471-01888-0, 311-318.

Young, T. Y. et al (Eds). Handbook of Pattern Recognition and Image Processing. Harcourt Brace Jovanovich (1986). ISBN 0-121-7745600-2. Chapter 9 "Image Segmentation," 215-231.

Trier, O.D. et al. Evaluation of Binarization Methods for Document Images. IEEE Trans. on Pattern Anal. and Machine Intell. 17 (1995) 312-315.

Liapsis, S. et al. Colour and texture segmentation using wavelet frame analysis, deterministic relaxation, and fast marching algorithms. J. Vis. Commun. Image R. 15 (2004) 1-26.

Keyes, L. et al. Using Moment Invariants for Classifying Shapes on Large-Scale Maps. Computers, Environment and Urban Systems 25. (2001) Available at http://eprints.may.ie/archive/00000064/. Downloaded Jul. 27, 2007.

Torres, R.S. et al. A Graph-based Approach for Multiscale Shape Analysis. Pattern Recognition 37(6) (2004) 1163-1174.

Kervrann, C. et al. A Markov Random Field model-based approach to unsupervised texture segmentation using local and global spatial statistics. IEEE Trans. on Image Process. 4(6) 1995, 856-862.

Trier, O.D. et al. Feature Extraction Methods for Character Recognition—a Survey. Pattern Recognition 29(4) 1996, 641-662.

De Castro, F.C.C. et al. Invariant Pattern Recognition of 2D Images Using Neural Networks and Frequency-Domain Representation. Int'l Conf. on Neural Networks 3(9), 1997, 1644-1649.

International Search Report dated Feb. 26, 2009 for PCT/US08/54513. Applicant: Iscon Video Imaging, Inc.

* cited by examiner

METHODS AND SYSTEMS FOR DETECTING CONCEALED OBJECTS

CROSS REFERENCE TO RELATED APPLICATIONS

This application claims priority of U.S. Provisional Application 60/740,743, "METHODS AND SYSTEMS FOR DETECTING CONCEALED OBJECTS," filed on Nov. 30, 2005, which is incorporated by reference herein.

BACKGROUND OF THE INVENTION

The present invention relates to detection of concealed objects.

The detection of weapons, contraband, and other concealed objects is of significant interest at security checkpoints and the like. Explosives detection for aviation security has been an area of federal concern for many years.

Much effort has been focused on direct detection of explosive materials in carry-on and checked luggage, but techniques have also been developed to detect and identify residual traces that may indicate a passenger's recent contact with explosive materials. The trace detection techniques use separation and detection technologies, such as mass spectrometry, gas chromatography, chemical luminescence, or ion mobility spectrometry, to measure the chemical properties of vapor or particulate matter collected from passengers or their carry-on luggage. Parallel efforts in explosives vapor detection have employed specially trained animals, usually dogs, as detectors.

The effectiveness of chemical trace analysis is highly dependent on three distinct steps: (1) sample collection, (2) sample analysis, and (3) comparison of results with known standards. If any of these steps is suboptimal, the test may fail to detect explosives that are present. When trace analysis is used for passenger screening, additional goals may include nonintrusive or minimally intrusive sample collection, fast sample analysis and identification, and low cost. While no universal solution has yet been achieved, ion mobility spectrometry is most often used in currently deployed equipment.

Several technologies have been developed and deployed on a test or prototype basis. One approach is to direct passengers through a portal, similar to a large doorframe, that contains detectors able to collect, analyze, and identify explosive residues on the person's body or clothing. The portal may rely on the passenger's own body heat to volatilize traces of explosive material for detection as a vapor, or it may use puffs of air that can dislodge small particles as an aerosol. Alternatively, a handheld vacuum "wand" may be used to collect a sample. In both cases, the collected samples are analyzed chemically.

A different approach is to test an object handled by the passenger, such as a boarding pass, for residues transferred from the passenger's hands. In this case, the secondary object is used as the carrier between the passenger and the analyzing equipment. The olfactory ability of dogs is sensitive enough to detect trace amounts of many compounds, but several factors have inhibited the regular use of canines as passenger explosives trace detectors. Dogs trained in explosives detection can generally only work for brief periods, have significant upkeep costs, are unable to communicate the identity of the detected explosives residue, and require a human handler when performing their detection role. In addition, direct contact between dogs and airline passengers raises liability concerns.

Metallic objects can be detected utilizing a magnetometer. Unfortunately, this approach does not detect most organic polymer and composite materials that may be used to fabricate firearms, explosives, and other objects which are frequently the subject of security inspections.

In another approach, millimeter wave electromagnetic radiation is applied to provide images that can reveal objects concealed by clothing. This approach typically depends on the ability of a human inspector to visually detect one or more suspect objects from the resulting image. Accordingly, there are intrinsic speed limitations in these approaches, and such approaches are subject to variation with the ability of different inspectors. Moreover, because these systems can provide detailed images of body parts that are ordinarily intended to be hidden by clothing, utilization of a human inspector can be embarrassing to the person being inspected, and may pose a concern that privacy rights are being violated. Thus, there is an on going demand for further contributions in this area of technology.

In conventional systems, infrared detection of concealed objects has failed in the most cases because infrared camera reacts only on heat differences between the object under cloth and background cloth. If an object is contact with a body (for example, a human body) for long enough to come to approximate thermal equilibrium, this difference in some cases will be negligible and contrast of the concealed object (for example, under cloth) is not enough for detection.

BRIEF SUMMARY OF THE INVENTION

One embodiment of the method of this invention for detecting the presence of concealed objects is passive, does not require any radiation source, uses thermal radiation of a body as a source of radiation. Other embodiments include unique systems, devices, methods, and apparatus to determine if a person is carrying a concealed object.

In one instance, an embodiment of the system of this invention includes a temperature modifying component capable of modifying the temperature distribution of an emitting body, one or more image acquisition devices capable of receiving electromagnetic radiation from the emitting body and of acquiring an image of the emitting body from the received electromagnetic radiation.

In another instance, an embodiment of the system of this invention also includes an analysis component capable of identifying one or more regions in the image, the analysis component being capable of receiving one or more images from the one or more image acquisition devices.

Methods of utilizing the system of this invention and computer usable medium having computer readable code embodied therein, the computer readable code being capable of causing one or more processors to execute the methods of this invention, are also disclosed.

For a better understanding of the present invention, together with other and further needs thereof, reference is made to the accompanying drawings and detailed description and its scope will be pointed out in the appended claims.

DETAILED DESCRIPTION OF THE INVENTION

In one instance, an embodiment of the system of this invention includes one or more temperature modifying components capable of modifying the temperature distribution of an emitting body, one or more image acquisition devices capable of receiving electromagnetic radiation from the emitting body and of acquiring an image of the emitting body from the received electromagnetic radiation.

In another instance, an embodiment of the system of this invention also includes an analysis component capable of identifying one or more regions in the image, the analysis component being capable of receiving one or more images from the one or more image acquisition devices.

In one embodiment of this invention, a thermal balance is disturbed by preheating or precooling. The image contrast for a concealed object is increased and the concealed object can be detected. In one embodiment, detection is by an operator; in another embodiment, detection is by an automatic device.

Figure 1:
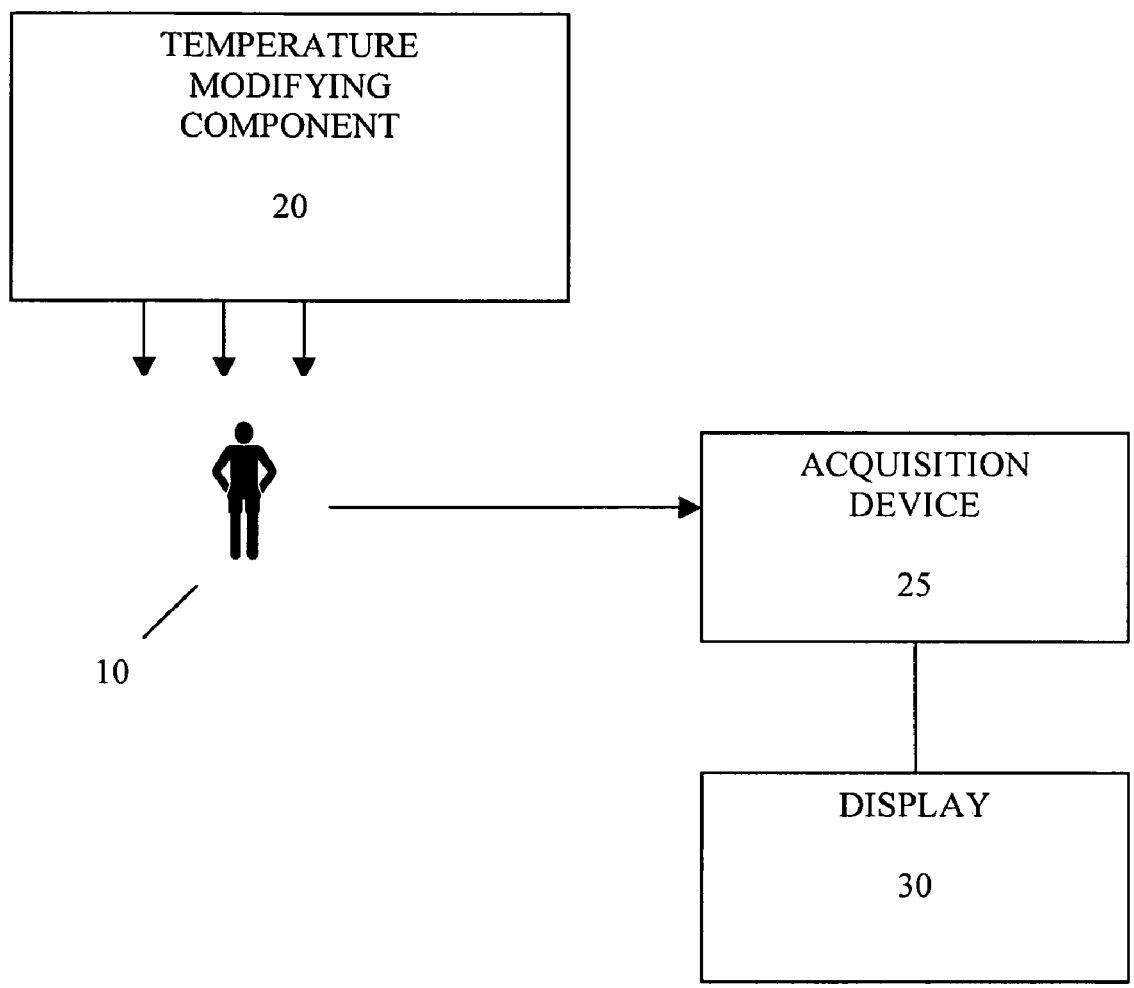
FIG. 1 is a graphical schematic representation of an embodiment of the system of this invention.

One embodiment of the system of this invention is shown in FIG. 1. Referring to FIG. 1, the one or more temperature modifying components 20 modifies the temperature distribution of a body 10. The body 10 emits electromagnetic radiation that is received by one or more acquisition devices 25. The one or more acquisition devices 25 acquire one or more images obtained from the received electromagnetic radiation. In one embodiment, the body 10 emits infrared electromagnetic radiation having a wavelength between about 0.75μ to about 1000μ. (The infrared range of electromagnetic radiation is typically divided into a near infrared range, from about 0.75μ to about 1.4μ, a short wavelength infrared range, from about 1.4μ to about 3μ, a mid wavelength infrared range, from about 3μ to about 8μ, a long wavelength infrared range, from about 8μ to 15μ, and a far infrared range from about 15μ to about 1000μ. It should be noted that the systems of this invention can be utilized in any of these ranges or in any combination of this ranges.) In one instance, the acquisition device 25 is an infrared camera. In the embodiment shown in FIG. 1, the one or more images obtained by the one or more acquisition devices 25 are provided to one or more displays 30.

Modifying the temperature distribution of a body having a concealed object (such as, but not limited to, and object concealed under clothing covering the body) allows detection of the concealed object from an image obtained from the electromagnetic radiation emitted by the body.

The modification of the temperature distribution of the body 10 can be obtained by heating the body 10 by means of the one or more temperature modifying components 20, cooling the body 10 by means of the one or more temperature modifying components 20, or a combination of cooling and heating. In one instance, the temperature modification is obtained by convection or by convection with forced air (such as, but not limited to, providing a stream of air at a different temperature, the stream being directed at the body 10). In one embodiment the stream of air (gas) is produced by a forced flow component (a fan in one embodiment). It should be noted that, while in some embodiments a single temperature modifying component, other embodiments have a number of temperature modifying components. Embodiments in which the temperature modifying components are placed at different locations of the body (around the periphery) in order to obtain temperature modification over the entire body are within the scope of this invention.

Figure 2:
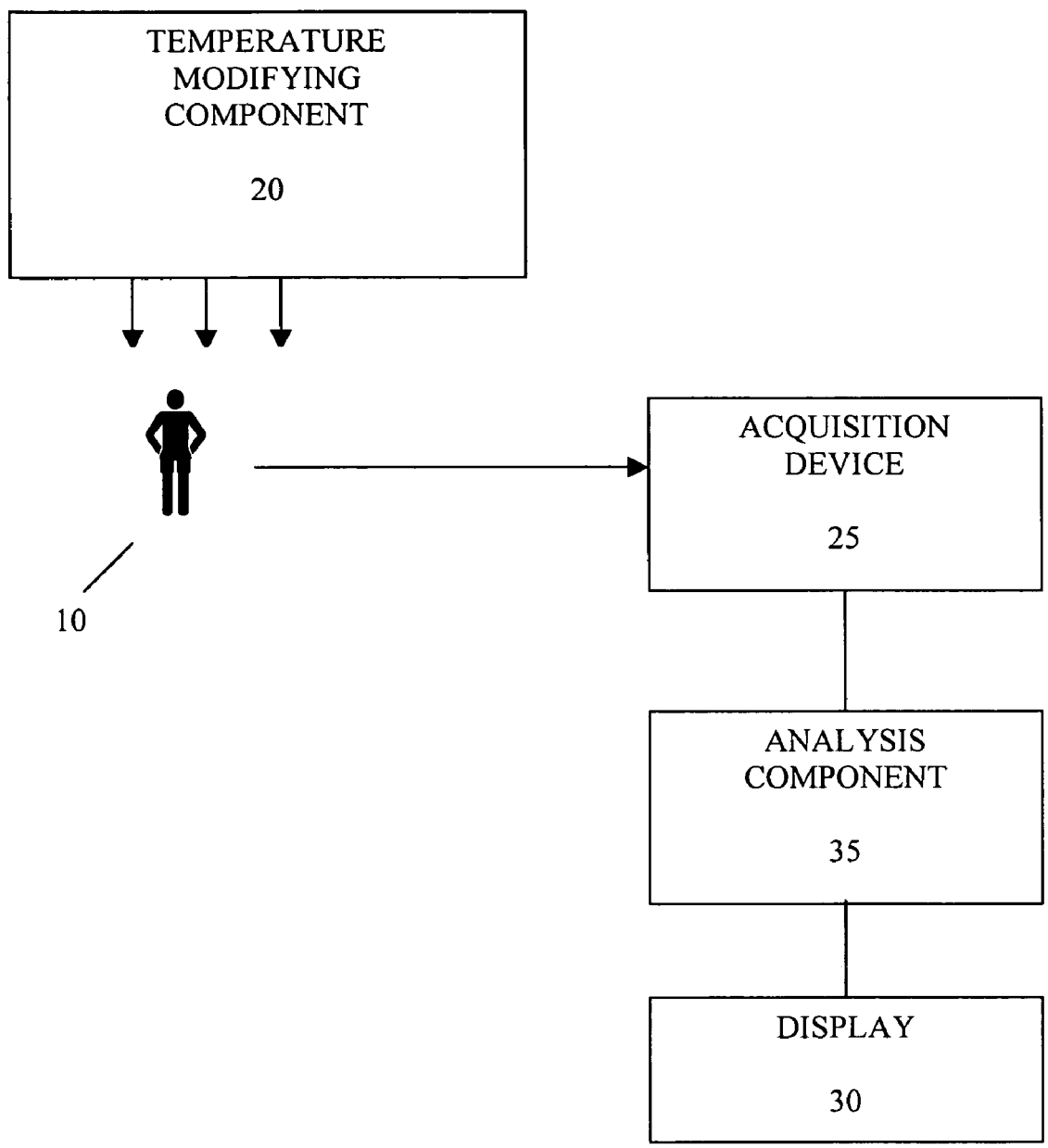
FIG. 2 is a graphical schematic representation of another embodiment of the system of this invention

Another embodiment of the system of this invention is shown in FIG. 2. Referring to FIG. 2, the system shown therein also includes an analysis component 35 receiving the one or more images from the one or more image acquisition devices 25. The analysis component 35 is capable of identifying one or more regions in the one or more images. The one or more images having the one or more regions identified are then provided to the display 30.

In one instance, the analysis component 35 is also capable of enhancing an image attribute in the one or more regions. Exemplary embodiments of the image attribute are, but this invention is not limited only to this embodiments, contrast or color. The one or more images having the enhanced image attribute in the one or more regions are then provided to the display 30.

Figure 3:
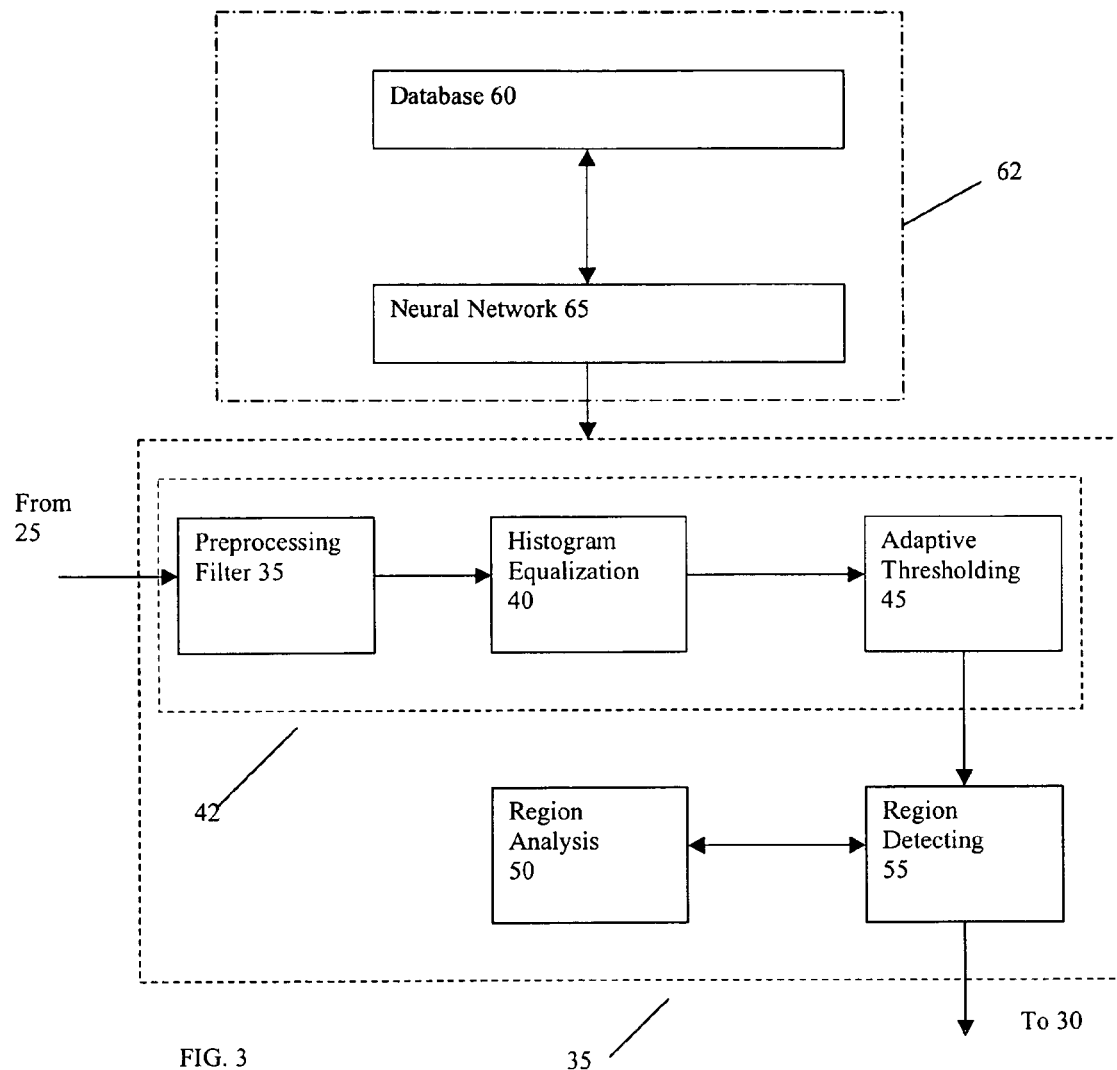
FIG. 3 is a schematic block diagram representation of an embodiment of the analysis component of an embodiment of the system of this invention.

A block diagram representation of an embodiment of the analysis component 35 is shown in FIG. 3. Referring to FIG. 3, the embodiment shown therein includes a pre-processing component 42 capable of enhancing detectability of the one or more regions in the one or more images received from the acquisition device 25. The embodiment shown in FIG. 3 also includes a region detecting component 55 capable of identifying the one or more regions in the one or more preprocessed images and a region analysis component 50 capable of determining characteristics of the one or more regions. In one instance, but this invention is not limited to only this embodiment, the characteristics include moment invariants.

In the embodiment shown in FIG. 3, the preprocessing component 42 includes a noise reduction component 37 capable of increasing a signal to noise ratio in the one or more images and a contrast enhancing component. The contrast enhancing component, in the embodiment shown in FIG. 3, includes a histogram equalization component 40 (see, for example, W. K. Pratt, Digital image Processing, ISBN0-471-01888-0, pp. 311-318, which is incorporated by reference herein) and an adaptive thresholding component 45 capable of binarizing an output of the histogram equalization component 40. (For adaptive thresholding, see, for example, but not limited to, Ø. D. Trier and T. Taxt, Evaluation of binarization methods for document images, available at http://citeseer.nj.nec.com/trier95evaluation.html, also a short version published in IEEE Transaction on Pattern Analysis and Machine Intelligence, 17, pp. 312-315, 1995, both of which are incorporated by reference herein.) In one embodiment, the binary output of the histogram equalization component is downsampled to obtain a downsampled image (in order to save processing time of the region detecting component 55). In one instance, the noise reduction component 37 is an adaptive noise reduction filter such as, but not limited to, a wavelet based noise reduction filter (see, for example, Mukesh Motwani, Mukesh Gadiya, Rakhi Motwani, and Frederick C. Harris, Jr., "A Survey of Image Denoising Techniques," in Proceedings of GSPx 2004, Sep. 27-30, 2004, Santa Clara Convention Center, Santa Clara, Calif., and Scheunders P. Denoising of multispectral images using wavelet thresholding.—Proceedings of the SPIE Image and Signal Processing for Remote Sensing IX, 2003, p. 28-35, both of which are incorporated by reference herein).

In one instance of the embodiment shown in FIG. 3, the region detecting component 55 includes segmentation to identify the one or more regions. (See for example, but not limited to, Ch. 9, Image Segmentation, in Handbook of Pattern Recognition and Image Processing, ISBN 0-121-774560-2, which is incorporated by reference herein, C. Kervrann and F. Heitz, "A Markov random field model based approach to unsupervised texture segmentation using local and global spatial statistics," IEEE Transactions on Image Processing, vol. 4, no. 6, 1995, 856-862.

http://citeseer.ist.psu.edu/kervrann93markov.html, which is incorporated by reference herein, and S. Liapis and E. Sifakis and G. Tziritas, "Colour and Texture Segmentation Using Wavelet Frame Analysis, Deterministic Relaxation, and Fast Marching Algorithms," http://citeseer.ist.psu.edu/liapis04colour.html, which is incorporated by reference herein.) In one embodiment, the region detecting component 55 labels each connective area (region) by unique label. Each region labeled is processed by the region analysis component 50 in order to determine shape characteristics (moment invariants, in one embodiment).

In one instance of the embodiment shown in FIG. 3, the region analysis component 50 characteristics include moment invariants (see for example, Keyes, Laura and Winstanley, Adam C. (2001) USING MOMENT INVARIANTS FOR CLASSIFYING SHAPES ON LARGE_SCALE MAPS. *Computers, Environment and Urban Systems* 25. available at http://eprints.may.ie/archive/00000064/, which is incorporated by reference herein). In the embodiment in which shape characteristics are important for object detection, the moments will identify concealed objects. (For example, circled objects have all moments starting from the second equal zero. Symmetrical objects have specific moments, etc.) Other embodiments of the characteristics obtained from the region analysis component 50 include, but are not limited to, multiscale fractal dimension and contour saliences, obtained using the image foresting transform, fractal dimension and Fourier descriptors (see for example, R. Torres, A. Falcao, and L. Costa. A graph-based approach for multiscale shape analysis. Pattern Recognition, 37(6):1163-1174, 2004, available at http://citeseer.ist.psu.edu/torres03graphbased.html, which is incorporated by reference herein).

In one instance, if a region with given characteristics (a given moment) values is detected, the region provided to the one or more displays 30 is enhanced by contrast, or by color.

In one instance, in the embodiments described above, some of the elements of the analysis component 35, such as, but not limited to, the noise reduction filter 37, histogram equalization component 40, the adaptive thresholding component 45, or/and the unsupervised segmentation component 55, are adaptive. Adaptation can be accomplished or enhanced by means of an adaptation component 62. In one embodiment, the adaptation component 62 includes a database 60 (in one instance, a computer usable medium for storing data for access by a computer readable code, the computer usable medium including a data structure stored in the computer usable medium, the data structure including information resident in a database, referred to as "a database") and a neural network component 65. It should be noted that although the embodiment shown in FIG. 3 utilizes a neural network for the adaptation (including optimizing of parameters), other methods of optimization are also within the scope of this invention. The adaptation component 62 can, in one embodiment, include a component utilizing artificial intelligence or decision logic (including fuzzy decision logic). In one embodiment, substantially optimal parameters of some of the elements of the analysis component 35, such as, but not limited to, the noise reduction filter 37, histogram equalization component 40, the adaptive thresholding component 45, or/and the unsupervised segmentation component 55, are determined (within a training procedure) by means of the neural network 65 and the database 60.

Figure 4:
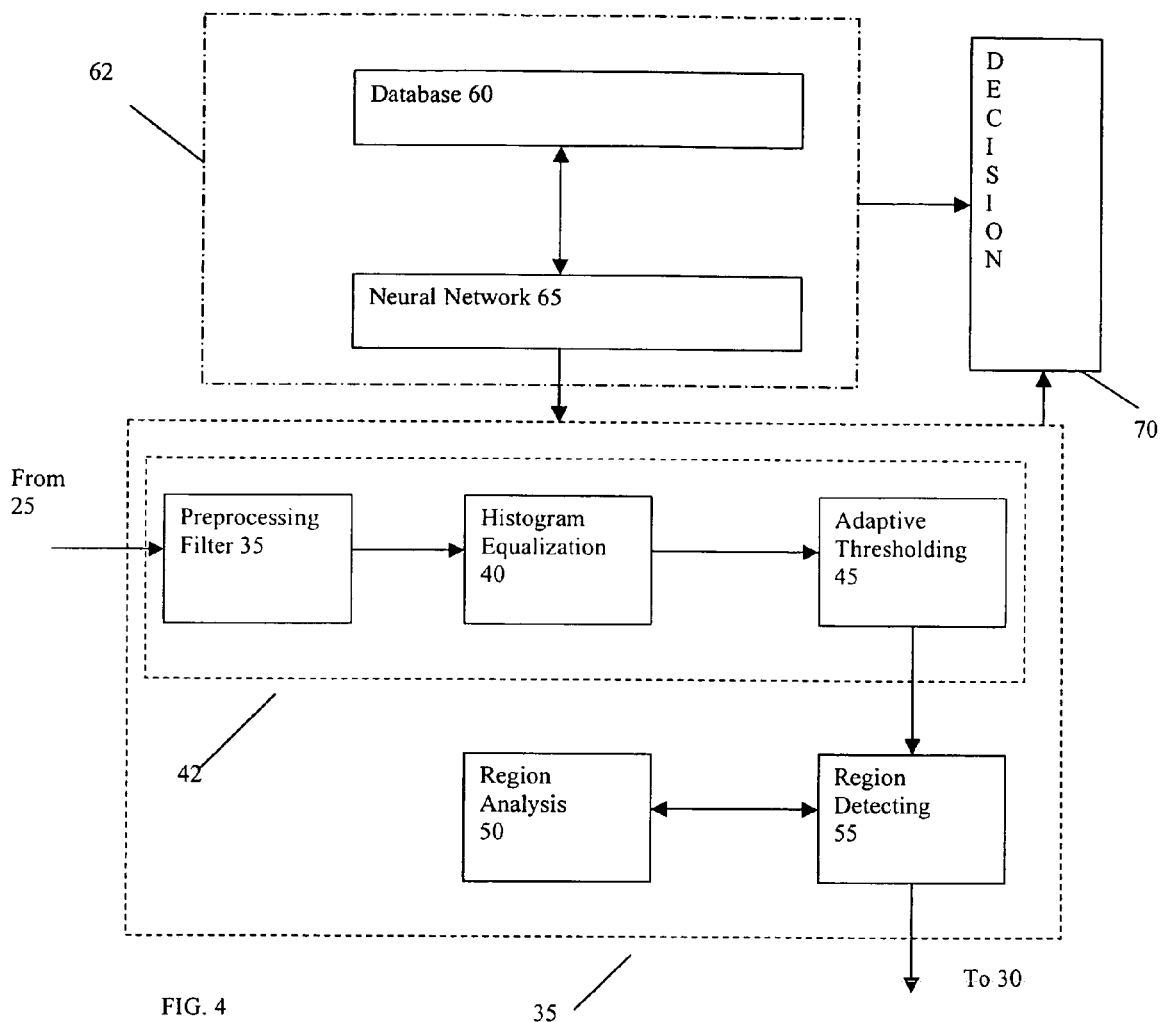
FIG. 4 shows a schematic block diagram representation of another embodiment of the analysis component of an embodiment of the system of this invention.

FIG. 4 shows another block diagram representation of an embodiment of the analysis component 35. Referring to FIG. 4, the output of the region processing component 55 including the shape characteristics (moment invariants) and input from an optimizing component (the neural network) and the database are provided to a decision component 70. The decision component 70 can be, but is not limited to, a component utilizing artificial intelligence or another neural network or decision logic (including fuzzy decision logic) (see for example, O. D. Trier, A. K. Jain and T. Taxt, "Feature extraction methods for character recognition—A survey," Pattern Recognition 29, pp. 641-662, 1996, available at http://citeseer.ist.psu.edu/trier95feature.html, which is incorporated by reference herein, Fernando Cesar C. De Castro et al, "Invariant Pattern Recognition of 2D Images Using Neural Networks and Frequency-Domain Representation," available at http://citeseer.ist.psu.edu/29898.html, which is also incorporated by reference herein). The decision component 70, in one embodiment, can supplement or replace the display 30 or, in another embodiment, can provide an alarm.

During application of an embodiment of the system of this invention, the presence of concealed objects is detected by modifying a temperature distribution of an emitting body (where the emitting body may contain concealed objects), acquiring one or more images produced by the electromagnetic radiation emanating from the emitting body after the temperature distribution has been modified, and providing the one or more images for detection of the presence of concealed objects. In one embodiment, the method of detecting the presence of concealed objects can include enhancing the detectability of one or more regions in the one or more acquired images before providing the one or more images for detection of the presence of concealed objects. In another instance, the method can also include identifying the one or more regions in the one or more images and determining characteristics of the one or more regions. In yet another instance, the method includes enhancing an image attribute in the one or more regions and displaying the one or more images. In another embodiment, the method of this invention also includes detecting the presence of concealed objects from the identified one or more regions and the characteristics (such as, but not limited to, moment invariants) of the one or more regions.

In a further instance of the method of this invention, at least one step from the steps of enhancing detectability of one or more regions, identifying the at least one region or determining characteristics of the at least one region is performed adaptively and the method also includes the step of enabling substantially optimal performance of the at least one adaptive step.

In one embodiment, the step of enhancing detectability of one or more regions includes increasing a signal to noise ratio in the one or more images. In another embodiment, the detectability is enhanced by enhancing contrast of the one or more images.

Figure 5:
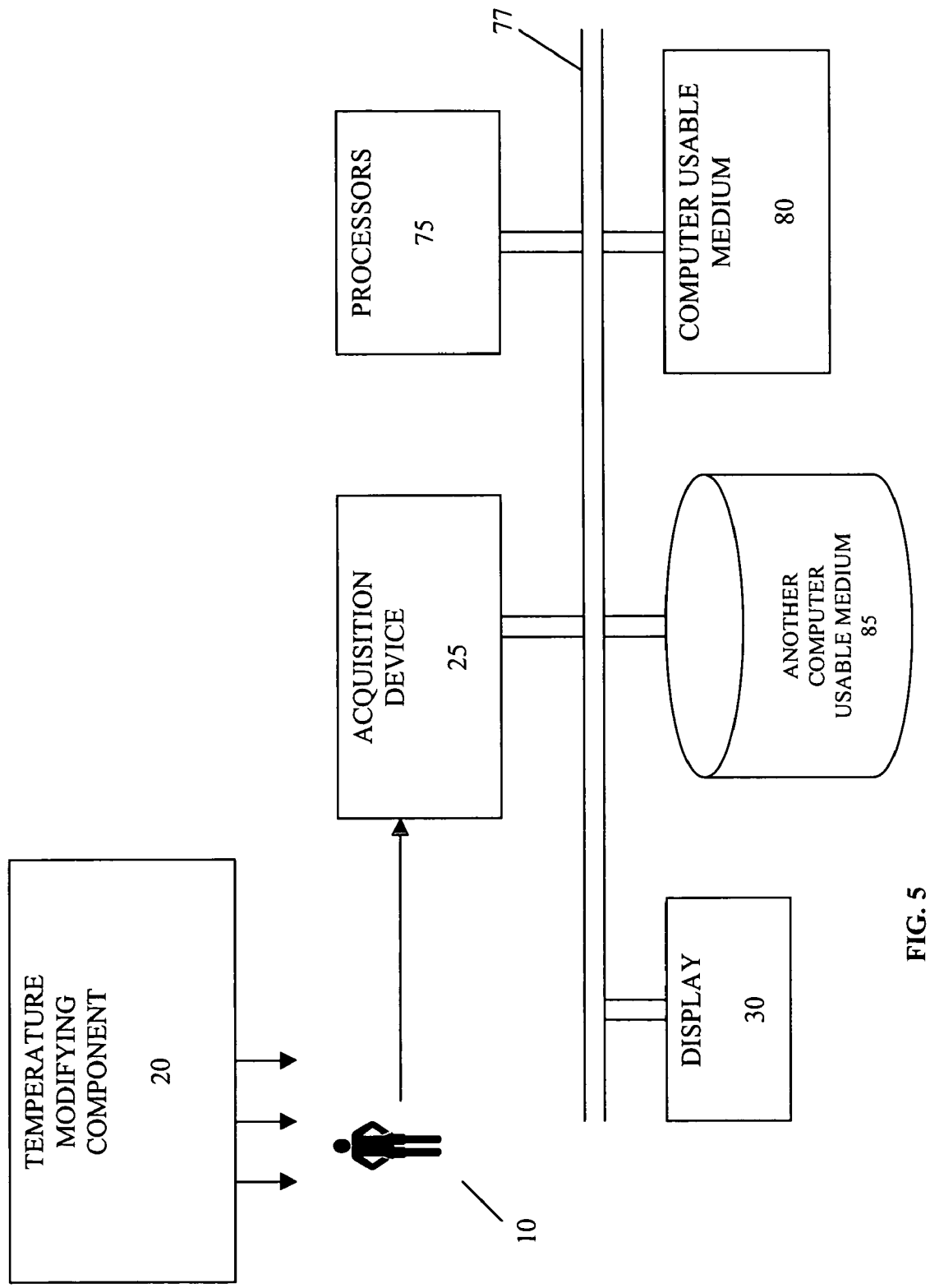
FIG. 5 is a graphical schematic representation of yet another embodiment of the system of this invention.

FIG. 5 is a graphical schematic representation of yet another embodiment of the system of this invention. Referring to FIG. 5, the embodiment shown therein includes the one or more temperature modifying components 20 capable of modifying the temperature distribution of the emitting body 10, the one or more image acquisition devices 25 capable of receiving the electromagnetic radiation emanating from the emitting body 10 and of acquiring one or more images of the emitting body 10 from the received electromagnetic radiation. In the embodiment shown in FIG. 5, the one or more acquisition devices 25 are operatively connected to one or more processors 75 and to one or more computer usable media 80. The one or more computer usable media 80 has computer readable code embodied therein, the computer readable code being capable of causing the one or more processors to execute the methods of this invention. In one embodiment, the computer readable code is capable of causing the one or more processors 70 to receive the one or more images from the one or more image acquisition devices 25, to enhance the detectability of one of more regions in the one or more images and to provide the one or more images to a detection component.

In one instance, the detection component is the display 30, which is also operatively connected to the one or more processors 70. In another instance, the detection component includes computer readable code embodied in the one or more computer usable media 80 and another computer usable medium 85 for storing data for access by the computer readable code, the other computer usable medium comprising a data structure stored in the other computer usable medium 85, the data structure including information resident in a database used by the computer readable code in detecting the presence of objects. It should be noted that embodiments in which the one or more computer usable media 80 and the other computer usable medium 85 are the same computer usable medium are within the scope of this invention.

The display element 30, the one or more acquisition devices 25, the one or more processors 70, the computer usable medium 80, and the other computer usable medium 85 are operatively connected by means of a connection component 77 (the connection component may be, for example, a computer bus, or a carrier wave).

The block diagram representation of an embodiment of the analysis component 35 shown in FIG. 3 or 4 can be implemented, in one embodiment, by means of the computer readable code embodied in the one or more computer usable media 80 and, in some instances, by means of the data structure, including information resident in the database, comprised in the other computer usable medium 85. In those embodiment, the computer readable code is also capable of causing there one or more processors 72 identify one or more regions in the one or more images and to determine characteristics of the one or more regions, or/and increase a signal to noise ratio in the one or more images, or/and enhance contrast into one or more images. In one instance, the computer readable code is capable of causing the one or more processors 70 to utilize wavelet based noise reduction methods. In another instance, the computer readable code is capable of causing the one or more processors 70 to enhance contrast by applying histogram equalization to the one or more images and by binarizing, using adaptive thresholding, the one or more images. In yet another instance, the computer readable code is capable of causing the one or more processors 72 applied adaptive techniques in implementing the analysis component 35 and to obtain substantially optimal performance of the adaptive analysis component 35.

In a further instance, in obtaining the substantially optimal performance of the adaptive analysis component 35 or in implementing the detection component, the computer readable code is capable of causing the one or more processors 70 to apply neural network techniques.

In order to better describe the methods and systems of this invention, the following exemplary embodiment is described herein below. One exemplary embodiment of the methods and systems of this invention is described hereinbelow in which the body 10 is a human body and the object is concealed under cloth. It should be noted that other embodiments are within the scope of this invention.

Figure 6:
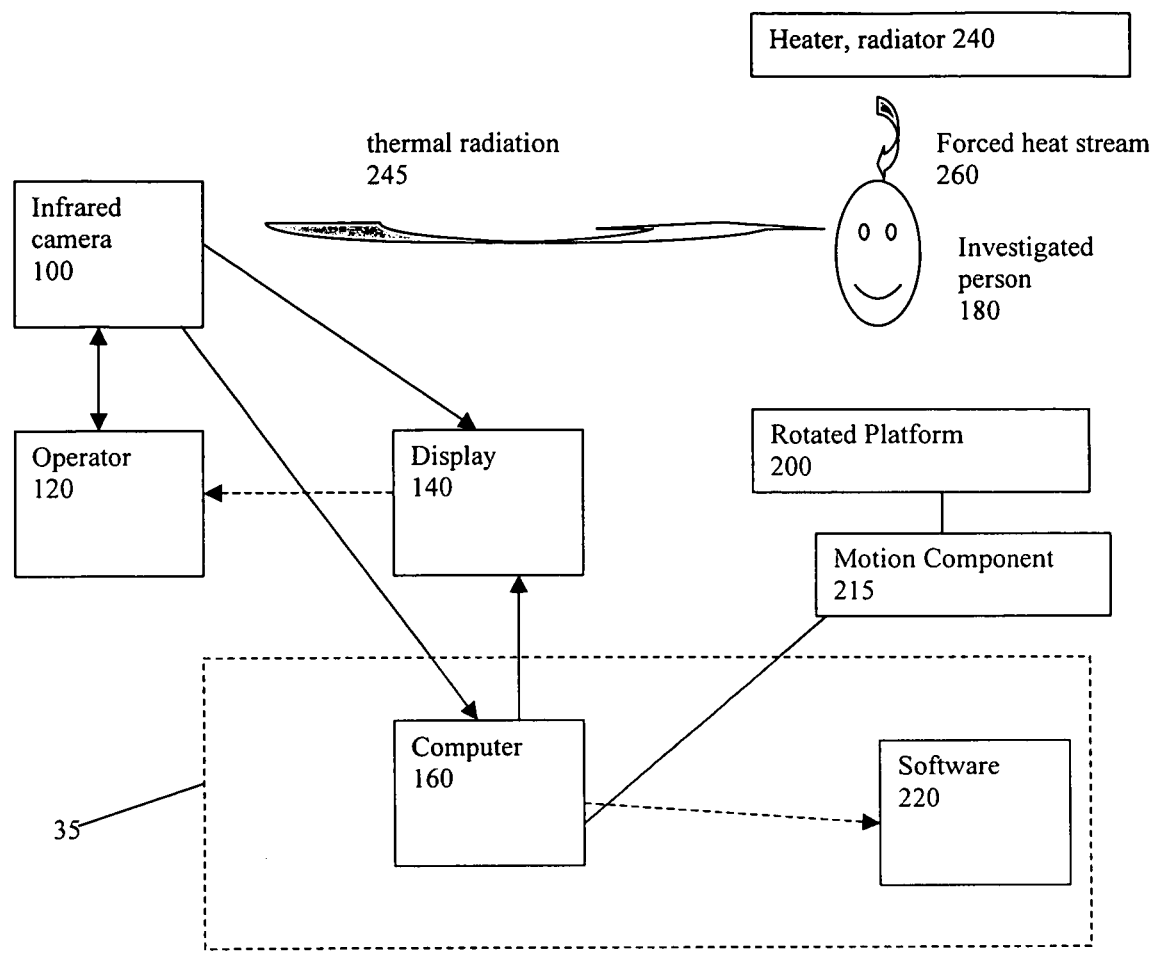
FIG. 6 is a graphical schematic representation of an exemplary embodiment of the system of this invention.

Referring to FIG. 6, thermal body radiation (heat) 245 emanates from an investigated person 180 and is received by an infrared camera 100. The infrared camera 100 can be stationary, remotely controlled or controlled by operator 120. The infrared Camera 100 generates an image, which is displayed at display 140. In one instance, the operator 120 watching the image is a decision maker about concealed object under cloth of the investigated person 180. The Infrared camera 100 provides an image signal to the computer 160. The image signal is analyzed, by means of computer readable code (software) 220 embodied in a computer usable medium in the computer 160, in order to detect the presence of objects concealed under cloth on the investigated person 180. The computer 160 and the computer readable code 220 represent an embodiment of the analysis component 35, such as the embodiment shown in FIG. 3. In one embodiment, the investigated person 180 is located on a platform 200. A motion component 215 is operatively connected to the platform 200 and capable of causing rotation of the platform 200. The motion component 215 is controlled by means of the Computer 160. The rotation of the platform 200 allows the camera 100 to observe the investigated person 180 from different angles. (In another embodiment, a number of cameras 100 located around the periphery of the location of the person 180 allow observation from different angles. In such an embodiment the platform 200 is replaced by a number of cameras 100 at different positions.) A temperature modifying device 240, a heating device in the embodiment shown, creates a forced heat stream 260 changing the temperature distribution (heating in this embodiment) of the investigated person 180 to create heat misbalance between the objects under cloth and human body temperature.

Figure 7A:
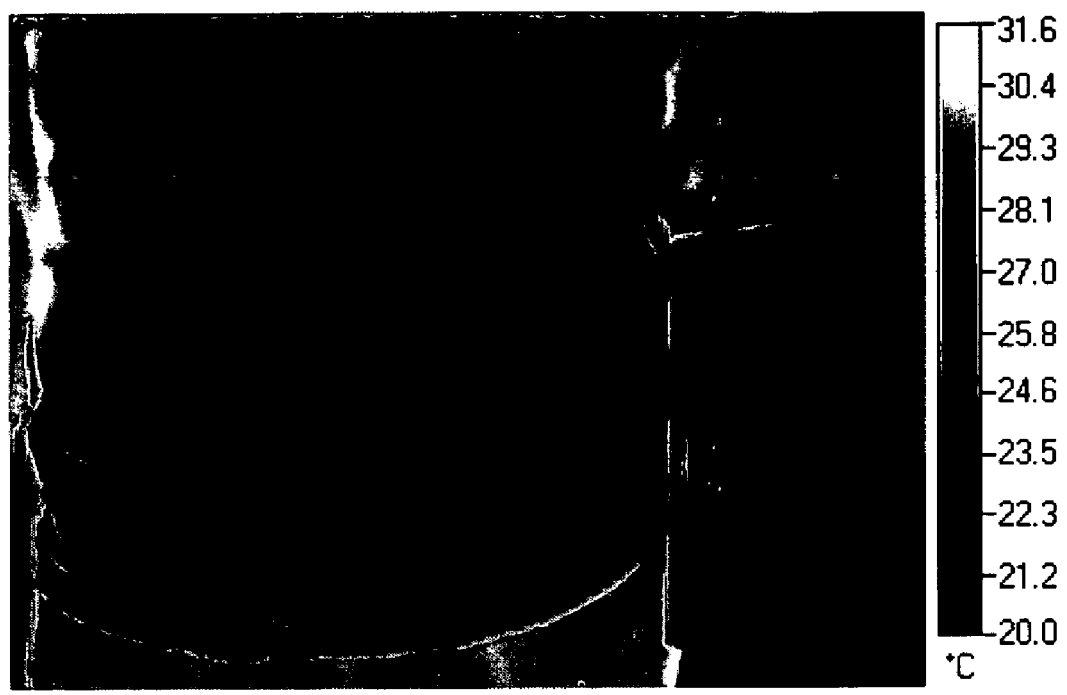
FIGS. 7a-7g are pictorial representations of results from an exemplary embodiment of the system of this invention.
Figure 7B:
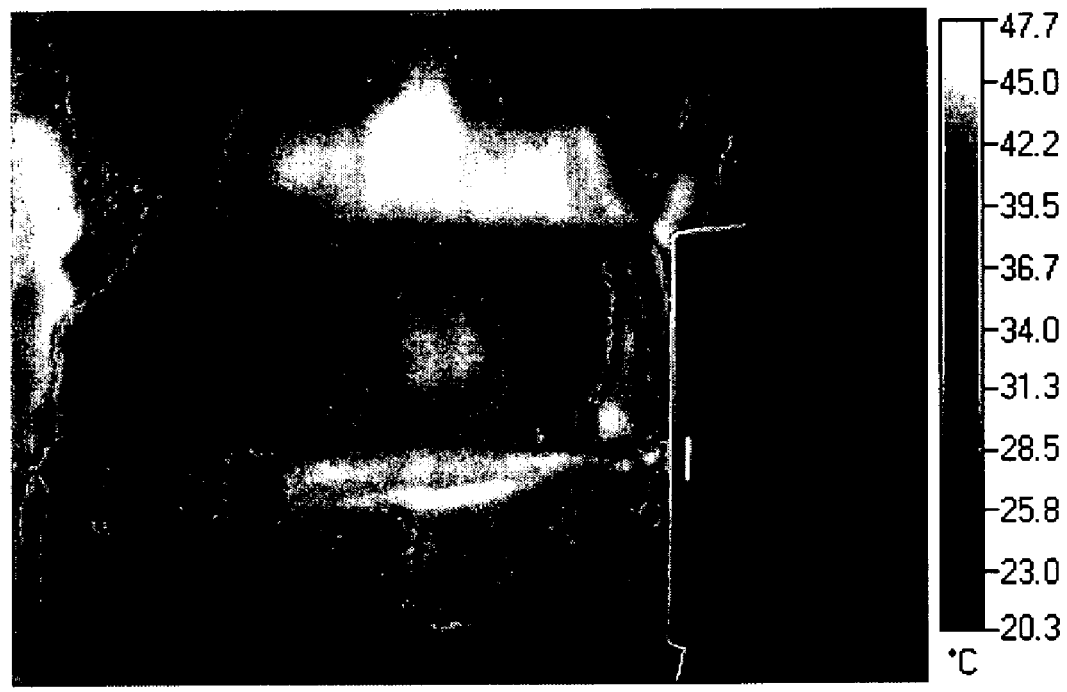
Figure 7C:
Figure 7D:
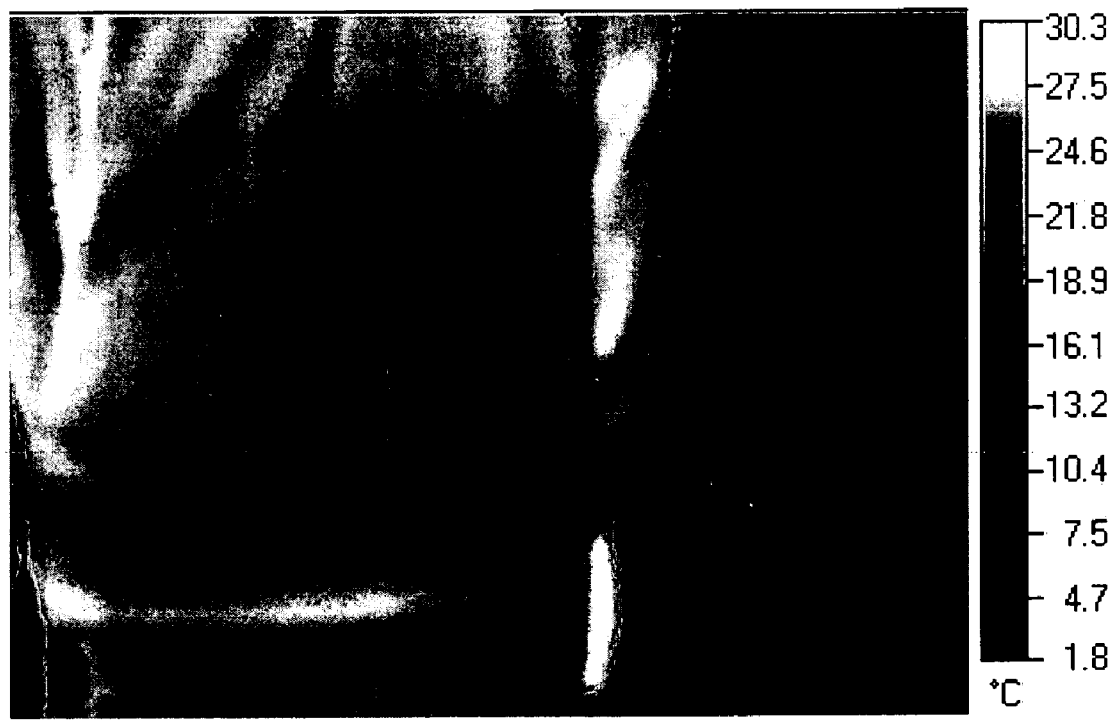
Figure 7E:
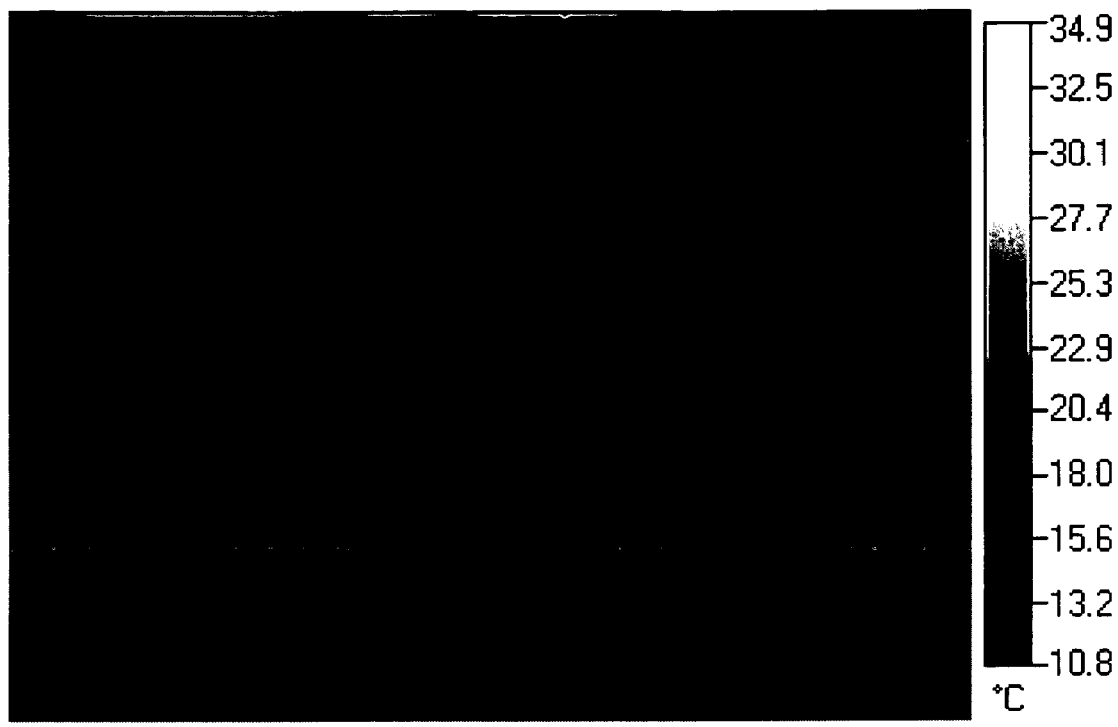
Figure 7F:
Figure 7G:

FIGS. 7a-7g show results obtained for the exemplary embodiment of FIG. 6 for different temperature modifying components 240. FIG. 7a shows an image obtained from the camera 100 without any temperature modification. FIG. 7b shows the image obtained after preheating by forced air. FIG. 7c shows the image obtained after preheating and then cooling, both by forced air. FIG. 7d shows another image obtained from the camera 100 without any temperature modification. FIG. 7e shows the image, corresponding to FIG. 7d, obtain after cooling with forced air. FIG. 7f shows yet another image obtained from the camera 100 without any temperature modification in which the object, concealed under a shirt and two sweaters, is almost invisible. FIG. 7g shows an image, obtained from the camera 100, of the same object as in FIG. 7f after the investigated person has been heated by a forced stream 260 from the radiator 240.

Figure 8A:
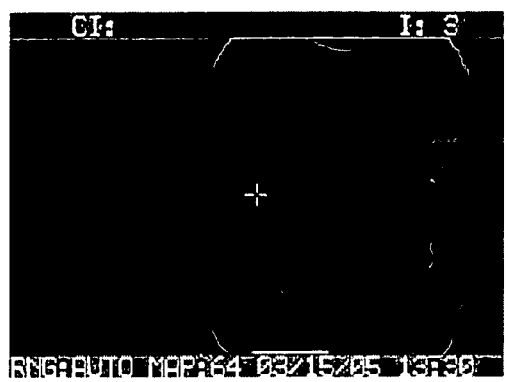
FIGS. 8a-8f are pictorial representations of other results from an exemplary embodiment of the system of this invention.
Figure 8B:
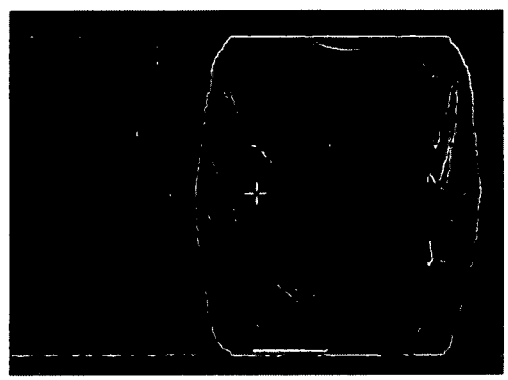
Figure 8C:
Figure 8D:
Figure 8E:
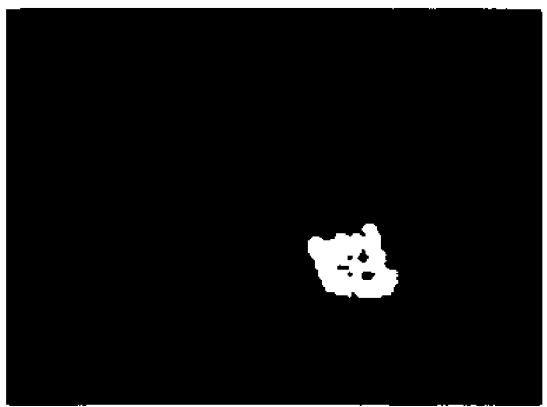
Figure 8F:
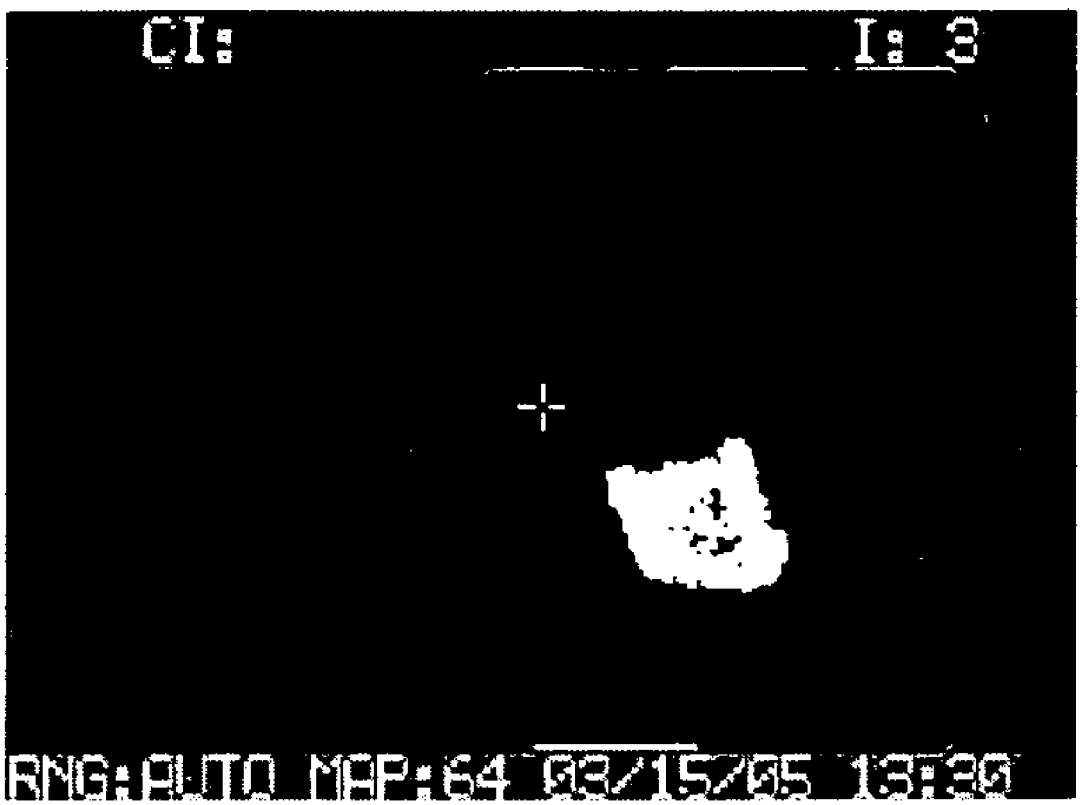

FIGS. 8a-8f show representations of images obtained utilizing the exemplary embodiment of FIG. 6 in which the analysis component 35 is an embodiment as shown in FIG. 3. FIG. 8a shows an image, obtained from camera 100, produced by thermal radiation from the body 180 after temperature modification (preheating). FIG. 8b shows a contrasted image created from the image of FIG. 8a by histogram equalization. FIG. 8c is a Binary image that is the output of the adaptive thresholding component. The binary image of FIG. 8c is downsampled (in order to save processing time of the region detecting component 55) to obtain a downsampled image shown in FIG. 8*d*. The region detecting component 55, with input (moment invariants) from the region analysis component 50, extracts an image including a given symmetrical region (concealed object), shown in FIG. 8*e*. An image (upsampled), shown in FIG. 8*f*, showing the enhanced region (concealed object), is displayed at the display 140.

It should be noted that other embodiments, besides the above described exemplary embodiment, are also within the scope of this invention.

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program (computer readable code) may be implemented in any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable (computer usable) media include, for example, a floppy disk, a flexible disk, hard disk, magnetic tape, or any other magnetic medium, a CDROM, any other optical medium, punched cards, paper tape, any other physical medium with patterns of holes or other patterns, a RAM, a PROM, and EPROM, a FLASH-EPROM, any other memory chip or cartridge, a carrier wave, such as electromagnetic radiation or electrical signals, or any other medium from which a computer can read.

Although the invention has been described with respect to various embodiments, it should be realized this invention is also capable of a wide variety of further and other embodiments within the spirit and scope of the appended claims.

What is claimed is:

1. A system for detecting a presence of concealed objects, the system comprising:
    at least one temperature modifying component for modifying a temperature distribution of an emitting body; said at least one temperature modifying component altering a thermal balance of said emitting body;
    at least one image acquisition device for receiving electromagnetic radiation from the emitting body and of acquiring at least one image of the emitting body from the received electromagnetic radiation; and
    an analysis component for identifying at least one region in said at least one image, said analysis component receiving said at least one image from said at least one image acquisition device;
    the received electromagnetic radiation from the emitting body, the emitting body having a modified temperature distribution, enabling detection of the presence of concealed objects.

2. The system of claim 1 further comprising:
    a display receiving at least one output image from said at least one image acquisition device.

3. The system of claim 1 wherein said at least one temperature modifying component comprises a component for heating the emitting body.

4. The system of claim 1 wherein said at least one temperature modifying component comprises a component for cooling the emitting body.

5. The system of claim 1 wherein said analysis component also enhances an image attribute in said at least one region.

6. The system of claim 5 wherein said image attribute is a contrast.

7. The system of claim 5 wherein said image attribute is a color.

8. The system of claim 1 wherein said analysis component comprises:
    a pre-processing component for enhancing detectability of said at least one region in said at least one image;
    said pre-processing component receiving said at least one image from said at least one image acquisition device.

9. The system of claim 8 wherein said analysis component further comprises:
    a region detecting component for identifying said at least one regions in said at least one image; said region detecting component receiving said at least one image from said pre-processing component; and
    a region analysis component for determining characteristics of said at least one region.

10. The system of claim 9 wherein said characteristics include moment invariants.

11. The system of claim 8 wherein said preprocessing component comprises a noise reduction component for increasing a signal to noise ratio in said at least one image.

12. The system of claim 11 wherein said noise reduction component is an adaptive noise reduction component.

13. The system of claim 11 wherein said noise reduction component is a wavelet based noise reduction component.

14. The system of claim 11 wherein said preprocessing component further comprises a contrast enhancing component for enhancing contrast in said at least one image.

15. The system of claim 8 wherein said preprocessing component comprises a contrast enhancing component for enhancing contrast in said at least one image.

16. The system of claim 15 wherein said contrast enhancing component comprises a histogram equalization component.

17. The system of claim 16 wherein said contrast enhancing component further comprises an adaptive thresholding component capable of binarizing an output of said histogram equalization component.

18. The system of claim 1 further comprising an optimization component;
    said analysis component being an adaptive analysis component; and
    said optimization component enabling substantially optimal adaptation of said adaptive analysis component.

19. The system of claim 18 wherein said optimization component comprises a neural network.

20. The system of claim 19 wherein said optimization component further comprises a database.

21. The system of claim 1 wherein at least some of said received electromagnetic radiation is in the infrared range of about 0.75µ to less than 1000µ.

22. The system of claim 1 wherein said at least one temperature modifying component comprises a forced flow component capable of inducing flow of a gas directed at the emitting body.

23. The system of claim 22 wherein said at least one temperature modifying component further comprises a component for heating the emitting body.

24. The system of claim 22 wherein said at least one temperature modifying component further comprises a component for cooling the emitting body.

25. The system of claim 1 further comprising:
a platform on which the emitting body is located; and
a motion component operatively connected to said platform and causing rotation of said platform.

26. A method for detecting a presence of concealed objects, the method comprising the steps of:
modifying a temperature distribution of an emitting body by altering a thermal balance of the emitting body;
acquiring, utilizing an acquisition device, at least one image from electromagnetic radiation emanating from the emitting body after the temperature distribution has been modified;
identifying, utilizing at least one processor and at least one computer readable medium having computer readable code that causes the processor to perform the method step, at least one region in the at least one image;
determining, utilizing at least one processor and at least one computer readable medium having computer readable code that causes the processor to perform the method step, characteristics of the at least one region;
enhancing detectability of the at least one region in the at least one acquired image, utilizing at least one processor and at least one computer readable medium having computer readable code that causes the processor to perform the method step; and
providing the at least one image for detection of the presence of concealed objects.

27. The method of claim 26 further comprising the step of enhancing an image attribute in the at least one region; and wherein the step of providing the at least one image comprises the step of displaying the at least one image.

28. The method of claim 27 wherein at least one step from the steps of enhancing detectability of at least one region, identifying the at least one region or determining characteristics of the at least one region is performed adaptively; and the method further comprises the step of enabling substantially optimal performance of the at least one adaptive step.

29. The method of claim 26 wherein the step of enhancing detectability of the at least one region comprises the step of increasing a signal to noise ratio in the at least one image.

30. The method of claim 29 wherein the step of enhancing detectability of the at least one region further comprises the step of enhancing contrast in the at least one image.

31. The method of claim 26 wherein the step of modifying the temperature distribution of the emitting body comprises the step of:
inducing flow of a gas directed at the emitting body.

32. A system for detecting a presence of concealed objects, the system comprising:
at least one temperature modifying component for modifying a temperature distribution of an emitting body; said modifying the temperature distribution comprising altering a thermal balance of said emitting body;
at least one image acquisition device for receiving electromagnetic radiation from the emitting body and of acquiring at least one image of the emitting body from the received electromagnetic radiation;
at least one processor; and
at least one computer usable medium having computer readable code embodied therein, the computer readable code causing said at least one processor to:
receive said at least one image from said at least one image acquisition device;
enhance detectability of at least one region in said at least one image; and
provide said at least one image with enhanced detectability to a detection component.

33. The system of claim 32 further comprising a display; and wherein said detection component comprises said display.

34. The system of claim 32 wherein said computer readable code also causes said at least one processor to:
identify said at least one region in said at least one image; and
determine characteristics of said at least one region.

35. The system of claim 32 wherein said computer readable code in causing said at least one processor to enhance detectability also causes said at least one processor to:
increase a signal to noise ratio in said at least one image.

36. The system of claim 35 wherein said computer readable code is in causing said at least one processor to increase a signal to noise ratio also causes said at least one processor to:
utilize wavelet based noise reduction methods.

37. The system of claim 32 wherein said computer readable code is in causing said at least one processor to enhance detectability also causes said at least one processor to:
enhance contrast in said at least one image.

38. The system of claim 37 wherein said computer readable code in causing said at least one processor to enhance contrast in said at least one image also causes said at least one processor to:
apply histogram equalization to said at least one image.

39. The system of claim 38 wherein said computer readable code is in causing said at least one processor to enhance detectability also causes said at least one processor to:
binarize, using adaptive thresholding, said at least one image after applying histogram equalization.

40. The system of claim 32 wherein said computer readable code also causes said at least one processor to:
identify said at least one region in said at least one image; and
determine characteristics of said at least one region; and
wherein, in causing said at least one processor to perform at least one of operation from a group of operations consisting of enhancing detectability of at least one region, identifying said at least one region and determining characteristics of said at least one region, said at least one processor is caused to apply adaptive techniques.

41. The system of claim 40 wherein said computer readable code also causes said at least one processor to:
enable substantially optimal performance of said at least one of operation from the group of operations consisting of enhancing detectability of at least one region, identifying said at least one region and determining characteristics of said at least one region.

42. The system of claim 41 wherein, in enabling substantially optimal performance, said computer readable code causes said at least one processor to:
apply neural network techniques.

43. The system of claim 41 further comprising:

another computer usable medium for storing data for access by said computer readable code, said another computer usable medium comprising:

a data structure stored in said another computer usable medium, said data structure including information resident in a database used by said computer readable code in enabling substantially optimal performance.

44. The system of claim 32 wherein said computer readable code also causes said at least one processor to:

identify said at least one region in said at least one image;

determine characteristics of said at least one region; and detect a presence of objects concealed in the emitting body utilizing said at least one image, said at least one region, and said characteristics.

45. The system of claim 44 further comprising:

another computer usable medium for storing data for access by said computer readable code, said another computer usable medium comprising:

a data structure stored in said another computer usable medium, said data structure including information resident in a database used by said computer readable code in detecting the presence of objects.

46. The system of claim 32 wherein at least some of said received electromagnetic radiation is in the range of about 0.75µ to less than 1 mm.

47. The system of claim 32 further comprising:

a platform on which the emitting body is located; and a motion component operatively connected to said platform and capable of causing rotation of said platform.

48. The system of claim 32 wherein said at least one temperature modifying component comprises a forced flow component capable of inducing flow of a gas directed at the emitting body.

49. The system of claim 48 wherein said at least one temperature modifying component further comprises a component capable of heating the emitting body.

50. The system of claim 48 wherein said at least one temperature modifying component further comprises a component capable of cooling the emitting body.

* * * * *

UNITED STATES PATENT AND TRADEMARK OFFICE
CERTIFICATE OF CORRECTION

| | | |
|---|---|---|
| PATENT NO. | : 7,657,092 B2 | Page 1 of 1 |
| APPLICATION NO. | : 11/312898 | |
| DATED | : February 2, 2010 | |
| INVENTOR(S) | : Gorian et al. | |

It is certified that error appears in the above-identified patent and that said Letters Patent is hereby corrected as shown below:

In column 12, lines 2-3 (claim 32) "and of acquiring" should read -- and for acquiring --

Signed and Sealed this
Twentieth Day of September, 2011

David J. Kappos
*Director of the United States Patent and Trademark Office*